US008110033B2

(12) United States Patent
Mizutani et al.

(10) Patent No.: US 8,110,033 B2
(45) Date of Patent: *Feb. 7, 2012

(54) INK COMPOSITION FOR INK JET RECORDING

(75) Inventors: Akira Mizutani, Matsumoto (JP); Shuichi Koganehira, Matsumoto (JP); Hironori Sato, Shiojiri (JP); Masashi Kamibayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 12/569,941

(22) Filed: Sep. 30, 2009

(65) Prior Publication Data

US 2010/0086685 A1    Apr. 8, 2010

(30) Foreign Application Priority Data

Sep. 30, 2008  (JP) .................................. 2008-255166
Feb. 10, 2009  (JP) .................................. 2009-028810
Aug. 20, 2009  (JP) .................................. 2009-191361

(51) Int. Cl.
    *C09D 11/02*    (2006.01)
(52) U.S. Cl. ............... 106/31.58; 106/31.59; 106/31.86; 106/31.89
(58) Field of Classification Search ............... 106/31.58, 106/31.59, 31.86, 31.89; 427/256, 288; 347/100
    See application file for complete search history.

(56) References Cited

U.S. PATENT DOCUMENTS

| | | | |
|---|---|---|---|
| 6,715,868 B2 | 4/2004 | Schmidt et al. | |
| 7,332,023 B2 | 2/2008 | Rehman et al. | |
| 2007/0247504 A1 | 10/2007 | Koganehira et al. | |
| 2009/0176071 A1* | 7/2009 | Koganehira et al. | 427/288 |
| 2009/0297716 A1* | 12/2009 | Koganehira et al. | 427/288 |
| 2010/0080962 A1* | 4/2010 | Koganehira et al. | 106/31.6 |
| 2010/0087595 A1* | 4/2010 | Koganehira et al. | 524/612 |
| 2010/0289848 A1* | 11/2010 | Koganehira et al. | 347/100 |

FOREIGN PATENT DOCUMENTS

| | | |
|---|---|---|
| JP | 2003-213179 A | 7/2003 |
| JP | 2003-253167 | 9/2003 |
| JP | 2004-526019 | 8/2004 |
| JP | 2005-194500 | 7/2005 |
| JP | 2006-249429 | 9/2006 |
| JP | 2007-277342 | 10/2007 |
| JP | 2009-209338 | 9/2009 |
| JP | 2009-209339 | 9/2009 |
| JP | 2009-209340 | 9/2009 |

(Continued)

OTHER PUBLICATIONS

English Patent Abstract of Japanese Publication No. 2003-213179A Published Jul. 30, 2003.

(Continued)

*Primary Examiner* — Helene Klemanski
(74) *Attorney, Agent, or Firm* — Ladas & Parry LLP

(57) ABSTRACT

An ink composition that achieves high-quality images free of white streaks or rough textures even when low-resolution printing is performed on printing paper such as art paper. The ink composition contains at least a colorant, water, and a surfactant, and further contains a sparingly water-soluble alkanediol, a water-soluble 1,2-alkanediol, a dialkylene glycol, and a water-soluble alkanetriol or a sugar. This ink composition is used in an ink jet recording method.

20 Claims, 1 Drawing Sheet

*THE VERTICAL AXIS OF THE GRAPH INDICATES THE AMOUNT (g) OF EACH ALCOHOL SOLVENT ADDED.

FOREIGN PATENT DOCUMENTS

WO    WO 2008/143086 A1 * 11/2008

OTHER PUBLICATIONS

English Patent Abstract of Japanese Publication No. 2003-253167 Published Sep. 10, 2003.

English Patent Abstract of Japanese Publication No. 2005-194500 Published Jul. 21, 2005.

English Patent Abstract of Japanese Publication No. 2006-249429 Published Sep. 21, 2003.

English Patent Abstract of Japanese Publication No. 2009-209340 Published Sep. 17, 2009.

English Patent Abstract of Japanese Publication No. 2009-209338 Published Sep. 17, 2009.

* cited by examiner

*THE VERTICAL AXIS OF THE GRAPH INDICATES THE AMOUNT (g) OF EACH ALCOHOL SOLVENT ADDED.

INK COMPOSITION FOR INK JET RECORDING

CROSS-REFERENCES TO RELATED APPLICATIONS

The entire disclosures of Japanese Patent Application No. 2008-255166, filed on Sep. 30, 2008, No. 2009-28810, filed on Feb. 10, 2009, and No. 2009-191361, filed on Aug. 20, 2009, are expressly incorporated by reference herein.

FIELD OF THE INVENTION

The present invention relates to an ink composition for ink jet recording that can form high-quality recorded matter using various types of recording media, in particular, recording media with low water absorbency such as artificial paper and printing paper.

BACKGROUND OF THE INVENTION

Ink jet recording methods are printing methods by which ink droplets are ejected and made to adhere on recording media such as paper. Due to recent innovative advancement in ink jet recording technologies, ink jet recording methods are being increasingly employed in the fields of high-definition printing that has been realized by silver halide prints and off-set printing heretofore. With this advancement, inks for ink jet recording have been developed that can produce images having glossiness comparable to silver halide prints by ink jet recording using highly glossy recording media, i.e., special paper, comparable to the developing paper, art paper, and the like that have been used in the fields of silver halide photos and off-set printing. Moreover, inks for ink jet recording that can achieve image quality comparable to silver halide photos even when normal paper is used have also been developed.

Due to recent widespread of image-forming technologies using digital data, desk top publishing (DTP) has become popular in the fields of printing in particular. Even when printing is performed through DTP, a proof for correcting color is produced beforehand to confirm the gloss and color of actual prints. Ink jet recording methods are being applied to outputting of such proofs. In DTP, color and stability of prints must be reproduced; thus, special paper for ink jet recording is normally used as recording media.

Special paper for ink jet recording is made such that a print has the same gloss and color as those of an actually output print on printing paper. As such, the quality and material for special paper are appropriately adjusted according to the type of printing paper but it increases the production cost to make special paper that is compatible to all varieties of printing paper. Thus, for color proof usage, it is desirable if ink jet recording can be performed on printing paper rather than special paper. If samples made by performing ink jet recording directly on printing paper without using special paper can be used as the final proof samples, possibly, the cost required for proofing can be dramatically saved. Moreover, synthetic paper prepared by mixing inorganic fillers and the like with polyethylene resins or polyester resins and forming the resulting mixtures into films is widely used in the field of printing and is attracting attentions as environmentally friendly products that have high recyclability.

Printing paper is coated paper having a coating layer for receiving oil-based inks on its surface and is characterized in that the coating layer has poor ink-absorbing property for water-based inks. Thus, when water-based pigmented inks commonly used in ink jet recording are used, the inks exhibit low permeability into the recording medium (printing paper) and ink bleeding or uneven aggregation may occur in the images.

To address the problem described above, for example, Japanese Unexamined Patent Application Publication No. 2005-194500 (Patent Document 1) discloses a pigment-based ink that reduces bleeding and exhibits excellent glossiness on special paper, in which a polysiloxane compound is used as a surfactant and an alkanediol such as 1,2-hexanediol is used as a dissolving aid. Japanese Unexamined Patent Application Publication No. 2003-213179 (Patent Document 2), Japanese Unexamined Patent Application Publication No. 2003-253167 (Patent Document 3), and Japanese Unexamined Patent Application Publication No. 2006-249429 (Patent Document 4) propose that high-quality images can are obtained by controlling the permeability of inks into recording media through addition of glycerin, a diol such as 1,3-butanediol, or a triol alcohol solvent such as pentanetriol to inks.

RELATED ART

[Patent Document 1] Japanese Unexamined Patent Application Publication No. 2005-194500
[Patent Document 2] Japanese Unexamined Patent Application Publication No. 2003-213179
[Patent Document 3] Japanese Unexamined Patent Application Publication No. 2003-253167
[Patent Document 4] Japanese Unexamined Patent Application Publication No. 2006-249429

SUMMARY OF THE INVENTION

The inventors of the subject invention have recently found that when an ink composition for ink jet recording contains a sparingly water-soluble alkanediol, a water-soluble alkanediol, a water-soluble 1,2-alkanediol, a dialkylene glycol, and a water-soluble alkanetriol or a sugar, high-quality images free of white streaks or rough textures can be achieved even when low-resolution printing is performed on a recording medium, such as printing paper, having a low liquid absorbency for water-based inks. The present invention was made on the basis of such a finding.

Accordingly, an object of the present invention is to provide an ink composition that can achieve high-quality images free of white streaks or rough textures even when low-resolution printing is conducted on a recording medium, such as printing paper, having low liquid absorbency for water-based inks.

An ink composition for ink jet recording according to the present invention contains at least a colorant, water, and a surfactant, and further contains a sparingly water-soluble alkanediol, a water-soluble 1,2-alkanediol, a dialkylene glycol, and a water-soluble alkanetriol or a sugar.

The present invention can provide an ink composition that can achieve high-quality images free of white streaks or rough textures even when low-resolution printing is conducted on a recording medium, such as printing paper, having low liquid absorbency for water-based inks.

DETAILED DESCRIPTION OF THE PRESENT INVENTION

Definitions

Figure 1:
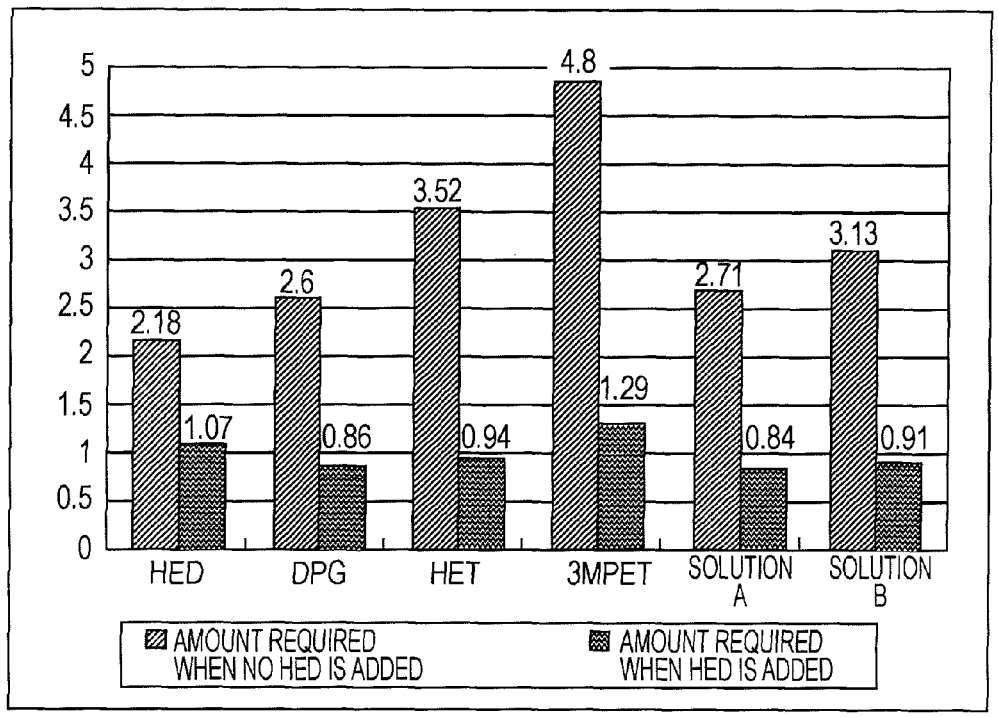
FIG. 1 is a graph showing solubility of 1,2-octanediol when alcohol solvents are added to an aqueous 1,2-octanediol solution.

In the specification, the hydrocarbon moiety of an alkanediol, a dialkylene glycol, and an alkanetriol may be linear or branched.

Moreover, "water-soluble" means that the solubility in water at 20° C. (the amount of a solute in 100 g water) is 10.0 g or more and "sparingly water-soluble" means that the solubility in water (the amount of a solute in 100 g water) is less than 1.0 g.

An ink composition for ink jet recording according to the present invention contains at least a colorant, water, and a surfactant, and further contains a sparingly water-soluble alkanediol, a water-soluble 1,2-alkanediol, a dialkylene glycol, and a water-soluble alkanetriol or a sugar.

<Ink Composition>

According to the ink composition for ink jet recording of the present invention, ink aggregation on printing paper, in particular, paper having relatively high ink-absorbing property such as art paper, POD paper (e.g., Ricoh business coat gloss 100 produced by Ricoh Corporation Ltd., etc.), and special paper for laser printers (e.g., LPCCTA4 manufactured by Seiko Epson Corporation etc.) can be suppressed, and an ink composition can be realized that achieves excellent ejection stability and produces high-quality images free of white streaks or rough textures even when low-resolution printing is performed.

In this specification, "aggregation of ink(s)" refers to local density unevenness of similar colors that occurs when a single-color image is printed (e.g., when a 6-inch square of a single color is printed (the color printed is one but the number of ink compositions used to achieve the single color may be more than one)) and does not mean that some parts of a recording medium surface remain uncoated with inks. "White streaks" refers to a phenomenon in which, when a single-color image is printed (e.g., when a 6-inch square of a single color is printed), there is no local density unevenness of similar colors but some parts of the recording medium surface remain uncoated with inks and appear as streaks. "Rough textures" or "filling failures" refers to a phenomenon in which, when a single-color image is printed as described above, there is no local density unevenness of similar colors but some portions of the recording medium surface remain uncovered with inks, thereby creating rough, granule-like textures in the surface of the recording medium.

According to the present invention, curling, i.e., inward warping of a printed surface, of the above-mentioned recording media can be suppressed even when thin printing paper having a thickness of 73.3 to 104.7 g/m$^2$ or 104.7 to 209.3 g/m$^2$ and preferably 73.3 to 104.7 g/m$^2$ is used.

The reason why high-quality images free of white streaks or rough textures can be achieved when a dialkylene glycol and a water-soluble alkanetriol or a sugar are added as essential components in addition to a sparingly water soluble alkanediol and a water-soluble 1,2-alkanediol is not clear but is presumably as follows.

Aggregation of inks that occurs when images are printed on printing paper is presumably caused by a high surface tension of ink droplets and a high contact angle of ink droplets with respect to the printing paper surface that result in printing paper repelling the ink. Even in the case where white streaks or filling failures occur in low-resolution printing, aggregation of inks is suppressed by decreasing the surface tension of the ink adhering on the surface of the printing paper.

In particular, white streaks and filling failures occur in low-resolution printing presumably because an ink droplet on the printing paper surface and an adjacent ink droplet contact and wet each other and spread, resulting in flowing of undried ink among the droplets. The ink flows among droplets presumably because the timing at which the adjacent ink droplets adhered on the surface is different, the size of the droplets at the time of adhesion is different, and thus the time taken for the droplet to dry is different. Thus, in order to suppress aggregation of inks and achieve high-quality images free of white streaks or rough textures even in low-resolution printing, it is preferable that an ink adhering on the printing paper have a low surface tension and a low flowability.

According to the ink composition of the present invention, an ink having a low surface tension and a low flowability can be realized without impairing other properties desired for the ink composition. In particular, even when an image is printed at a low resolution, a high-quality image free of white streaks or rough textures can be achieved.

The dialkylene glycol and the water-soluble alkanetriol used in the present invention are substances that exhibit a viscosity similar to glycerin. The dialkylene glycol and the water-soluble alkanetriol are also permeable humectants that exhibit a lower surface tension than glycerin. For example, the surface tension of a 10% aqueous solution of 3-methyl-1,3,5-pentanetriol, which is one of the preferred examples of the water-soluble alkanetriol, is 47.5 mN/m. The surface tension of a 10% aqueous solution of dipropylene glycol, which is one of the preferred examples of the dialkylene glycol, is 52.6 mN/m.

Ejection stability improves by combining the dialkylene glycol and the water-soluble alkanetriol having such properties with a sparingly water-soluble alkanediol and a water-soluble 1,2-alkanediol. The ejection stability improves as the alkyl chains in the dialkylene glycol and the water-soluble alkanetriol become shorter. A "short" alkyl chain means that the length of the alkyl chain is 7 or less.

The reason why curling of prints formed with thin printing paper can be suppressed by addition of a dialkylene glycol and a water-soluble alkanetriol or a sugar in addition to a sparingly water-soluble alkanediol and a water-soluble 1,2-alkanediol is not clear but is presumably as follows.

The water-soluble 1,2-alkanediol is a polar solvent and can be used as a film-forming aid for resins. It is presumed that when such an effect is inhibited, shrinkage on film formation of resins can be prevented. In order to inhibit the effect, a weakly polar solvent is preferred. A nonpolar solvent has excessively low compatibility with resins and thus does not have an inhibiting effect. A weakly polar solvent preferably includes, on the same carbon atom, an alkyl group having a +I effect and a hydroxyl group having a –I effect. It is presumed that the dialkylene glycol inhibits shrinkage on film formation of the water-soluble 1,2-alkanediol and curling is suppressed due to the effect of delaying drying brought about by the water-soluble alkanetriol or sugar under this condition. As for the curling of a recording medium with a resin-free ink composition, the curling occurs presumably because the positions of bonds such as hydrogen bonds shift by dissociation and re-binding of the bonds such as hydrogen bonds in the recording medium as the recording medium absorbs water in the inks and is dried rapidly. Since the water-soluble 1,2-alkanediol is a polar solvent and accelerates dissociation of the bonds such as hydrogen bonds in the recording medium, the recording medium may curl. The hydroxyl group in the water-soluble alkanetriol or the sugar presumably obstructs re-bonding of the bonds such as hydrogen bonds in the recording medium and delays drying. It is thought that this leads to suppression of curling.

In this invention, the sparingly water-soluble alkanediol is preferably an alkanediol having 7 or more carbon atoms and more preferably an alkanediol having 7 to 10 carbon atoms. Examples thereof include 1,2-heptanediol, 1,2-octanediol, 5-methyl-1,2-hexanediol, 4-methyl-1,2-hexanediol, and 4,4-dimethyl-1,2-pentanediol. Among these, 1-2-octanediol is more preferred.

The water-soluble 1,2-alkanediol is preferably an alkanediol having 6 or less carbon atoms. Examples thereof include 1,2-hexanediol, 1,2-pentanediol, 1,2-butanediol, 4-methyl-1,2-pentanediol, and 3,3-dimethyl-1,2-butanediol. Among these, a water-soluble alkanediol having a surface tension of 28 mN/m when dissolved to form a 15% aqueous solution is more preferred. In particular, 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m) are preferred. From the viewpoint of odor during printing, 1,2-hexanediol is preferred.

In this invention, the dialkylene glycol is preferably a dialkylene glycol having 2 to 4 carbon atoms. Examples thereof include diethylene glycol, dipropylene glycol, and dibutadiene glycol. Dipropylene glycol is preferred.

In this invention, examples of the water-soluble alkanetriol include 1,2,6-hexanetriol and 3-methyl-1,3,5-pentanetriol.

In the present invention, examples of the sugar include monosaccharides, disaccharides, oligosaccharides (including trisaccharides and tetrasaccharides), polysaccharides, and derivatives thereof. Among these, glucose, mannose, fructose, ribose, xylose, arabinose, galactose, glucitol, sorbitol, maltose, cellobiose, lactose, sucrose, trehalose, maltotriose, filanose, and raffinose are preferred. Of these, raffinose is particularly preferred. When raffinose is added to the ink composition of the present invention, the intermittent printing property improves.

Polysaccharides refer to sugars in broad sense and include substances widely distributed throughout nature such as alginic acid, α-cyclodextrin, and cellulose. Examples of the derivatives of these sugars include reduced sugars (e.g., sugar alcohols (general formula: $HOCH_2(CHOH)_nCH_2OH$ (where n represents an integer of 2 to 5), oxidized sugars (e.g., aldonic acid and uronic acid), amino acids, and thiosugars of the above-mentioned sugars. Among these, sugar alcohols are particularly preferred. Examples thereof include maltitol, sorbitol, and xylitol. Commercially available products may be used as these sugars. For example, HS20, HS30, and HS500 (products of Hayashibara Shoji Inc.) and Oligo GGF (product of Asahi Kasei Corporation) are suitable for use.

It is thought that the dialkylene glycol and the water-soluble alkanetriol or the sugar have a function of a dissolving aid for the sparingly water-soluble alkanediol.

In the present invention, the content of the sparingly water-soluble alkanediol is preferably 1 to 3 percent by weight and more preferably 1.5 to 2.5 percent by weight relative to the entire ink composition. When the content is within these ranges, in particular, when the content is not lower than the lower limit, printing nonuniformity can be more effectively suppressed for a recording medium having a low ink-absorbing property such as printing paper. When the content is within these ranges, i.e., when the content does not exceed the upper limit, the solubility in the ink can be further enhanced.

In the present invention, the content of the water-soluble 1,2-alkanediol is preferably 0.5 to 6 percent by weight and more preferably 0.5 to 3 percent by weight relative to the entire ink composition. When the content is within these ranges, in particular, when the content is not lower than the lower limit, the solubility of the sparingly water-soluble alkanediol in the ink can be more effectively increased. When the content is within these ranges, i.e., when the content does not exceed the upper limit, the initial viscosity of the ink can be further reduced.

In the present invention, the content of the dialkylene glycol is preferably 2 to 12 percent by weight and more preferably 3 to 6 percent by weight relative to the entire ink composition.

In the present invention, the content of the water-soluble alkanetriol is preferably 2 to 12 percent by weight and more preferably 3 to 6 percent by weight relative to the entire ink composition.

In the present invention, the content of the sugar is preferably 2 to 12 percent by weight and more preferably 3 to 6 percent by weight relative to the entire ink composition. When the content is within these ranges, in particular, when the content is not lower than the lower limit, the solubility of the sparingly water-soluble alkanediol in the ink can be more effectively increased. When the content is within these ranges, i.e., when the content does not exceed the upper limit, the initial viscosity of the ink can be further reduced.

According to a preferred embodiment of the present invention, the content ratio of the sparingly water-soluble alkanediol to the water-soluble 1,2-alkanediol is preferably 6:1 to 1:3 and more preferably 6:1 to 1:1. When the content is within these ranges, the sparingly water-soluble alkanediol can be stably dissolved in the ink and thus the ejection stability improves. That is, when the ratio of the water-soluble 1,2-alkanediol is within these ranges, in particular, when the ratio does not exceed the upper limit, both reduction of the ink initial viscosity and reduction of the uneven aggregation can be achieved. When the ratio of the water-soluble 1,2-alkanediol is within the above-described ranges, in particular, when the ratio is not lower than the lower limit, the sparingly water-soluble alkanediol can be stably dissolved in the ink, the changes in viscosity over time can be suppressed, and the storage stability can be further maintained.

According to a preferred embodiment of the present invention, the content ratio of the dialkylene glycol to the water-soluble alkanetriol is preferably 3:1 to 1:3 and more preferably 2:1 to 1:2. When the ratio is within these ranges, occurrence of curls can be suppressed further. In other words, when the ratio of the dialkylene glycol is within these ranges, in particular, when the ratio does not exceed the upper limit, the initial viscosity can be further reduced, the ink flight rate can be increased, and the accuracy of adhering droplets can be improved. This is more preferable since the sparingly water-soluble 1,2-alkanediol can be stably dissolved. When the ratio of the dialkylene glycol is within the above-described ranges, in particular, when the ratio is not lower than the lower limit, the effect of the water-soluble 1,2-alkanediol of inhibiting shrinkage on film formation is maintained and occurrence of curls can be further suppressed.

According to a preferred embodiment of the present invention, the content ratio of the dialkylene glycol to the sugar is preferably 3:1 to 1:3 and more preferably 2:1 to 1:2. When the ratio is within these ranges, occurrence of curls can be suppressed further. In other words, when the ratio of the dialkylene glycol is within these ranges, in particular, when the ratio does not exceed the upper limit, the initial viscosity can be further reduced, the ink flight rate can be increased, and the accuracy of adhering droplets can be improved. This is more preferable since the sparingly water-soluble 1,2-alkanediol can be stably dissolved. When the ratio of the dialkylene glycol is within the above-described ranges, in particular, when the ratio is not lower than the lower limit, the effect of the water-soluble 1,2-alkanediol of inhibiting shrinkage on film formation is maintained and occurrence of curls can be further suppressed.

According to a preferred embodiment of the present invention, the content ratio of the water-soluble 1,2-alkanediol to the dialkylene glycol is preferably 1:1 to 1:12 and more preferably 1:1 to 1:6. When the ratio is within these ranges, white streaks and rough textures can be further suppressed even when an image is printed on printing paper at a low resolution. In other words, when the ratio of the water-soluble 1,2-alkanediol is within these ranges, in particular, when the ratio does not exceed the upper limit, the increase in initial ink viscosity and the decrease in drying property can be more effectively prevented. When the ratio of the dialkylene glycol is within these ranges, in particular, when the ratio is not lower than the lower limit, the clogging recovery property can be maintained, the drying property can be enhanced, the time can be allowed for the ink to wet and spread, and thus, occurrence of white streaks can be effectively prevented.

According to a preferred embodiment of the present invention, the content ratio of the sparingly water-soluble alkanediol to the total of the dialkylene glycol and the water-soluble alkanetriol is preferably 1:1 to 1:18 and more preferably 1:1 to 1:6. When the ratio is within these ranges, the initial viscosity of the ink can be decreased and a good clogging recovery property can be achieved. In other words, when the ratio of the total content of the dialkylene glycol and the water-soluble alkanetriol is within these ranges, in particular, when the ratio does not exceed the upper limit, the increase in initial ink viscosity and the decrease in drying property can be more effectively prevented. When the ratio of the total content of the dialkylene glycol and the water-soluble alkanetriol is within these ranges, in particular, when the ratio is not lower than the lower limit, the clogging recovery property can be maintained, the drying property can be enhanced, the time can be allowed for the ink to wet and spread, and thus, occurrence of white streaks can be more effectively prevented.

According to a preferred embodiment of the present invention, the content ratio of the sparingly water-soluble alkanediol to the total of the dialkylene glycol and the sugar is preferably 1:1 to 1:18 and more preferably 1:1 to 1:6. When the ratio is within these ranges, the initial viscosity of the ink can be decreased and a good clogging recovery property can be achieved. In other words, when the ratio of the total content of the dialkylene glycol and the sugar is within these ranges, in particular, when the ratio does not exceed the upper limit, the increase in the initial ink viscosity and the decrease in drying property can be more effectively prevented. When the ratio of the total content of the dialkylene glycol and the sugar is within these ranges, in particular, when the ratio is not lower than the lower limit, the clogging recovery property can be maintained, the drying property can be enhanced, the time can be allowed for the ink to wet and spread, and thus, occurrence of white streaks can be more effectively prevented.

According to a preferred embodiment of the present invention, the content ratio of the water-soluble 1,2-alkanediol to the total of the dialkylene glycol and the water-soluble alkanetriol is preferably 1:1 to 1:36 and more preferably 1:1 to 1:18. When the ratio is within these ranges, white streaks and rough textures can be further suppressed even when an image is printed on printing paper at a low resolution. In other words, when the ratio of the water-soluble 1,2-alkanediol is within these ranges, in particular, when the ratio does not exceed the upper limit, the increase in initial ink viscosity and decrease in drying property can be more effectively prevented. When the ratio of the total content of the dialkylene glycol and the water-soluble alkanetriol is within these ranges, in particular, when the ratio is not lower than the lower limit, the clogging recovery property can be maintained, the drying property can be enhanced, the time can be allowed for the ink to wet and spread, and thus, occurrence of white streaks can be more effectively prevented.

According to a preferred embodiment of the present invention, the content ratio of the water-soluble 1,2-alkanediol to the total of the dialkylene glycol and the sugar is preferably 1:1 to 1:36 and more preferably 1:1 to 1:18. When the ratio is within these ranges, white streaks and rough textures can be further suppressed even when an image is printed on printing paper at a low resolution. In other words, when the ratio of the water-soluble 1,2-alkanediol is within these ranges, in particular, when the ratio does not exceed the upper limit, the increase in initial ink viscosity and the decrease in drying property can be more effectively prevented. When the ratio of the total content of the dialkylene glycol and the sugar is within these ranges, in particular, when the ratio is not lower than the lower limit, the clogging recovery property can be maintained, the drying property can be enhanced, the time can be allowed for the ink to wet and spread, and thus, occurrence of white streaks can be more effectively prevented.

According to a preferred embodiment of the present invention, the sum of the content of the sparingly water-soluble alkanediol and the content of the water-soluble 1,2-alkanediol is preferably 6 percent by weight or less relative to the ink composition. When the sum is within this range, uneven aggregation does not occur with a recording medium with a low ink absorbing property such as printing paper and good ejection stability can be achieved.

According to a preferred embodiment of the present invention, the sum of the content of the dialkylene glycol and the content of the water-soluble alkanetriol is preferably 3 to 18 percent by weight and more preferably 4 to 8 percent by weight relative to the entire ink composition. When the sum is within these ranges, in particular, when the sum is not lower than the lower limit, occurrence of white streaks and rough textures can be further effectively prevented even when an image is printed on printing paper at a low resolution. When the sum is within these ranges, i.e., when the sum does not exceed the upper limit, the decrease in drying property of the print immediately after completion of printing can be more effectively prevented.

According to a preferred embodiment of the present invention, the sum of the content of the dialkylene glycol and the content of the sugar is preferably 3 to 18 percent by weight and more preferably 4 to 8 percent by weight relative to the entire ink composition. When the sum is within these ranges, in particular, when the sum is not lower than the lower limit, occurrence of white streaks and rough textures can be further effectively prevented even when an image is printed on printing paper at a low resolution. When the sum is within these ranges, i.e., when the sum does not exceed the upper limit, the decrease in drying property of the print immediately after completion of printing can be more effectively prevented.

According to a preferred embodiment of the present invention, the sum of the content of the sparingly water-soluble alkanediol, the content of the dialkylene glycol, and the content of the water-soluble alkanetriol is preferably 21 percent by weight or less relative to the ink composition. When the sum is within this range, uneven aggregation does not occur with a recording medium with a low ink absorbing property such as printing paper and good ejection stability and suppression of curling can be achieved.

According to a preferred embodiment of the present invention, the sum of the content of the sparingly water-soluble alkanediol, the content of the dialkylene glycol, and the content of the sugar is preferably 21 percent by weight or less relative to the ink composition. When the sum is within this range, uneven aggregation does not occur with a recording medium with a low ink absorbing property such as printing paper and good ejection stability and suppression of curling can be achieved.

In addition to the four types of components described above, the ink composition of the present invention may further include an alkyl ether of a polyhydric alcohol according to a preferred embodiment of the present invention. Addition of the alkyl ether of the polyhydric alcohol improves the clogging recovery property in the ink cap for capping an ink jet head. Here, the "clogging in the ink cap" means that the waste liquid remaining in the cap becomes dry and solidified, thereby clogging fine pores of an ink-absorbing member such as nonwoven cloth in the ink cap. The decrease in rate of succeeding cleaning can be prevented and the nozzle clogging recovery property can be enhanced by improving the clogging recovery property in the ink cap.

The alkyl ether of the polyhydric alcohol is preferably a methyl ether of an alkylene glycol. Examples thereof include propylene glycol monomethyl ether, ethylene glycol monomethyl ether, diethylene glycol dimethyl ether, dipropylene glycol monomethyl ether, triethylene glycol dimethyl ether, and triethylene glycol monomethyl ether. From the aggregation viewpoint, a monomethyl ether of an alkylene glycol is more preferred, and in view of flash point, a methyl ether of triethylene glycol is preferred. In view of environmental toxicity and eco toxicity, a triethylene glycol monomethyl ether is preferred.

When a triethylene glycol monomethyl ether is contained, according to an embodiment of the present invention, the content thereof is preferably 0.5 to 9.0 percent by weight and more preferably 0.5 to 3.0 percent by weight relative to the entire ink composition.

When the triethylene glycol monomethyl ether is contained, according to an embodiment of the present invention, the content ratio of the triethylene glycol monomethyl ether to the sparingly water-soluble alkanediol is preferably 3:1 to 1:6 and more preferably 3:1 to 1:1. When the ratio is within these ranges, the clogging recovery property in the ink cap for capping the ink jet head can be further improved.

According to a preferred embodiment of the present invention, the ratio of the total of the triethylene glycol monomethyl ether and the water-soluble 1,2-alkanediol to the content of the sparingly water-soluble alkanediol is preferably 3:1 to 1:6 and more preferably 3:1 to 1:1. When the ratio is within these ranges, the clogging recovery property in the ink cap for capping the ink jet head can be further improved.

According to a preferred embodiment of the present invention, the content ratio of the triethylene glycol monomethyl ether to the water-soluble 1,2-alkanediol is preferably 5:1 to 1:5 and more preferably 5:1 to 1:1. When the ratio is within these ranges, the clogging recovery property in the ink cap for capping the ink jet head can be further improved.

In the present invention, the sum of the content of the triethylene glycol monomethyl ether and the content of the water-soluble 1,2-alkanediol is not particularly limited but is preferably 9.0 percent by weight or less and more preferably 3.0 percent by weight or less relative to the ink composition. When the ratio is within these ranges, the clogging recovery property in the ink cap for capping the ink jet head can be further improved.

<Colorant>

Any of dyes and pigments can be used as the colorant used in the ink composition of the present invention; however, from the viewpoints of resistance to light and water, pigments are preferably used.

Inorganic pigments and organic pigments can be used as the pigments either alone or as a mixture of a plurality of types of pigments. As the inorganic pigment, for example, titanium oxide, iron oxide, and carbon black produced by known methods such as a contact method, a furnace method, a thermal method, or the like, can be used. As the organic pigment, azo pigments (azo lakes, insoluble azo pigments, condensed azo pigments, chelate azo pigments, etc.), polycyclic pigments (e.g., phthalocyanine pigments, perylene pigments, perinone pigments, anthraquinone pigments, quinacridone pigments, dioxazine pigments, thioindigo pigments, isoindolinone pigments, quinophthalone pigments, etc.), dye chelates (e.g., basic dye chelates, acidic dye chelates, etc.), nitro pigments, nitroso pigments, aniline black, and the like can be used.

Specific examples of the pigment can be adequately provided according to the type (color) of the ink composition desired. For example, examples of the pigment for the yellow in k composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. These may be used alone or in combination. Among these, it is preferable to use at least one selected from the group consisting of C.I. Pigment Yellow 74, 110, 128, and 129. Examples of the pigment for a magenta ink composition include C.I. Pigment Red 5, 7, 12, 48(Ca), 48(Mn), 57(Ca), 57:1, 112, 122, 123, 168, 184, 202, and 209; and C.I. Pigment Violet 19. These may be used alone or in combination. Among these it is preferable to use at least one selected from the group consisting of C.I. Pigment Red 122, 202, and 209, and C.I. Pigment Violet 19. More preferably, they are solid solutions. Examples of the pigment for a cyan ink composition include C.I. Pigment Blue 1, 2, 3, 15:3, 15:4, 15:34, 16, 22, and 60; and C.I. Vat Blue 4 and 60. These may be used alone or in combination. Among these, C.I. Pigment Blue 15:3 and/or 15:4 is preferably used. C.I. Pigment Blue 15:3 is particularly preferably used.

Examples of the pigment for a black ink composition include inorganic pigments including carbons such as lampblack (C.I. Pigment Black 6), acetylene black, furnace black (C.I. Pigment Black 7), channel black (C.I. Pigment Black 7), carbon black (C.I. Pigment Black 7) and the like and iron oxide pigments; and organic pigments such as aniline black (C.I. Pigment Black 1). In the present invention, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (products of Mitsubishi Chemical Corporation up to here), SpecialBlaek 4A, 550, Printex 95, 90, 85, 80, 75, 45, and 40 (products of Degussa Corporation up to here), Regal 660, RmogulL, monarch 1400, 1300, 1100, 800, and 900 (products of Cabot Corporation up to here), Raven 7000, 5750, 5250, 3500, 3500, 2500 ULTRA, 2000, 1500, 1255, 1200, 1190 ULTRA, 1170, 1100 ULTRA, and Raven 5000 UIII (products of Columbian Chemicals Company up to here).

The concentration of the pigment is not particularly limited since it can be adjusted to an appropriate pigment concentration (content) in preparing the ink composition. In the present invention, the solid content of the pigment is preferably 6 percent by weight or more and more preferably 12 percent by weight or more. When ink droplets adhere on the recording medium, the ink wets and spreads on the surface of the recording medium. However, when the pigment solid concentration is increased to 6 percent by weight or more, the flowability of the ink is quickly lost after the ink stops wetting and spreading. Thus, bleeding can be further suppressed even when an image is printed on a recording medium such as printing paper at a low resolution. In other words, the combined use of the particular four types of components mentioned above allows the ink to wet and spread even on a recording medium having a low ink absorbing property. In addition, since the ink solid concentration is high, the flowability of the ink on the recording medium is decreased and bleeding can be suppressed. In particular, the effect of suppressing bleeding is particularly notable at the boundaries between portions where the amount of ink adhered is small and portions where the amount of the ink adhered is large in the recording medium.

The pigment is preferably a pigment kneaded with a dispersant described below from viewpoints of achieving image glossiness, bronzing prevention, and storage stability of the ink composition and forming a color image having better glossiness.

<Dispersant>

The ink composition of the present invention preferably contains at least one resin that serves as a dispersant for dispersing the colorant, the at least one resin being selected from styrene-acrylic acid copolymer resins, urethane resins, and fluorene resins. These copolymer resins adsorb onto the pigment and improve the dispersibility.

Specific examples of hydrophobic monomers for the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyl toluene. These may be used alone or as a mixture of two or more.

Specific examples of the hydrophilic monomer include acrylic acid, methacrylic acid, maleic acid, and itaconic acid.

The copolymer resin of the hydrophobic monomer and the hydrophilic monomer described above is preferably at least one of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, and a styrene-(meth)acrylic acid-(meth)acrylic acid ester copolymer resin from viewpoints of achieving image glossiness, bronzing prevention, and storage stability of the ink composition and forming a color image having better glossiness.

The copolymer resin may be a resin (styrene-acrylic acid resin) that contains a polymer obtained by a reaction of styrene with acrylic acid or an acrylic acid ester. Alternatively, the copolymer resin may be an acrylic acid-based water-soluble resin. Alternatively, sodium, potassium, and ammonium salts thereof may be used.

The copolymer resin content is preferably 20 to 50 parts by weight and more preferably 20 to 40 parts by weight relative to 100 parts by weight of the pigment from viewpoints of achieving image glossiness, bronzing prevention, and storage stability of the ink composition and forming a color image having better glossiness.

In the present invention, since a urethane resin is used as a pigment dispersant, glossiness of color images, bronzing prevention, and storage stability of the ink composition can be achieved and a color image having better glossiness can be formed. A urethane resin refers to a resin that contains a polymer obtained by a reaction between a diisocyanate compound and a diol compound. In the present invention, the urethane resin is preferably a resin having a urethane bond and/or an amido bond and an acidic group.

Examples of the diisocyanate compound include araliphatic diisocyanate compounds such as hexamethylene diisocyanate and 2,2,4-trimethylhexamethylene diisocyanate, aromatic diisocyanate compounds such as toluoylene diisocyanate and phenylmethane diisocyanate, and denaturated products thereof.

Examples of the diol compounds include polyethers such as polyethylene glycol and polypropylene glycol, polyesters such as polyethylene adipate and polybutylene adipate, and polycarbonates.

The urethane resin preferably includes a carboxyl group.

In the present invention, a fluorene resin may be used as a pigment dispersant.

The weight ratio (copolymer resin/urethane resin) of the copolymer resin to the urethane resin is preferably 1/2 to 2/1 and more preferably 1/1.5 to 1.5/1 from viewpoints of achieving glossiness of color images, bronzing prevention, and storage stability of the ink composition and forming a color image having better glossiness.

The weight ratio (pigment/components other than pigment) of the solid content of the pigment to the solid content of components other than the pigment is preferably 100/20 to 100/80 from viewpoints of achieving glossiness of color images, bronzing prevention, and storage stability of the ink composition and forming a color image having better glossiness.

The copolymer resin content is preferably 20 to 50 parts by weight and more preferably 20 to 40 parts by weight relative to 100 parts by weight of the pigment from viewpoints of achieving glossiness of color images, bronzing prevention, and storage stability of the ink composition and forming a color image having better glossiness.

The urethane resin content is preferably 10 to 40 parts by weight and more preferably 10 to 35 parts by weight relative to 100 parts by weight of the pigment from viewpoints of achieving glossiness of color images, bronzing prevention, and storage stability of the ink composition and forming a color image having better glossiness.

The fluorene resin content is preferably 20 to 100 parts by weight and more preferably 20 to 80 parts by weight relative to 100 parts by weight of the pigment from viewpoints of achieving glossiness of color images, bronzing prevention, and storage stability of the ink composition and forming a color image having better glossiness.

The total content of the copolymer resin and the urethane resin is preferably 90 parts by weight or less (more preferably 70 parts by weight or less) relative to 100 parts by weight of the pigment from viewpoints of achieving glossiness of color images, bronzing prevention, and storage stability of the ink composition and forming a color image having better glossiness.

The acid value of the copolymer resin is preferably 50 to 320 and more preferably 100 to 250 from viewpoints of achieving glossiness of color images, bronzing prevention, and storage stability of the ink composition and forming a color image having better glossiness.

The acid value of the urethane resin is preferably 10 to 300 and more preferably 20 to 100 from viewpoints of achieving glossiness of color images, bronzing prevention, and storage stability of the ink composition and forming a color image having better glossiness. Note that an "acid value" is the amount in terms of milligrams of KOH required to neutralize one gram of resin.

The weight-average molecular weight (Mw) of the copolymer resin is preferably 2,000 to 30,000 and more preferably 2,000 to 20,000 from viewpoints of achieving glossiness of color images, bronzing prevention, and storage stability of the ink composition and forming a color image having better glossiness.

The weight-average molecular weight (Mw) of the urethane resin before cross-linking is preferably 100 to 200,000 and more preferably 1,000 to 50,000 from viewpoints of achieving glossiness of color images, bronzing prevention, and storage stability of the ink composition and forming a color image having better glossiness. Mw is measured by, for example, gel permeation chromatography (GPC).

The glass transition temperature (Tg, measured according to JIS K 6900) of the copolymer resin is preferably 30° C. or more and more preferably 50° C. to 130° C. from viewpoints of achieving glossiness of color images, bronzing prevention, and storage stability of the ink composition and forming a color image having better glossiness.

The glass transition temperature (Tg, measured according to JIS K 6900) of the urethane resin is preferably −50° C. to 200° C. and more preferably −50° C. to 100° C. from viewpoints of achieving glossiness of color images, bronzing prevention, and storage stability of the ink composition and forming a color image having better glossiness.

In the pigment dispersion, the copolymer resin is adsorbed on the pigment in some cases and is left free in other cases. The maximum particle diameter of the copolymer resin is preferably 0.3 μm or less and more preferably 0.2 μm or less (and most preferably 0.1 μm or less) from viewpoints of achieving glossiness of color images, bronzing prevention, and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The fluorene resin may be any resin having a fluorene backbone and can be obtained by, for example, copolymerizing the monomer units below:

Cyclohexane, 5-isocyanate-1-(isocyanate methyl)-1,3,3-trimethyl (CAS No. 4098-71-9)

Ethanol, 2,2'-[9H-fluoren-9-ylidene bis(4,1-phenyleneoxy)]bis(CAS No. 117344-32-8)

Propionic acid, 3-hydroxy-2-(hydroxymethyl)-2-methyl (CAS No. 4767-03-7)

Ethanamine, N,N-diethyl-(CAS No. 121-44-8)

A surfactant may be used as a dispersant. Examples of the surfactant include anionic surfactants such as fatty acid salts, higher alkyl dicarboxylic acid salts, higher alcohol sulfuric acid ester salts, higher alkyl sulfonic acid salts, condensates of higher fatty acids and amino acids, sulfosuccinic acid ester salts, naphthenic acid salts, liquid fatty oil sulfuric acid ester salts, and alkyl allyl sulfonic acid salts; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. When the surfactant is added to the ink composition, it naturally serves as a surfactant also.

<Surfactant>

The ink composition of ink jet recording according to the present invention contains a surfactant as an essential component. When a surfactant is used for a recording medium having a surface coated with a resin for receiving the ink, an image having good glossiness can be formed on a recording medium, such as photographic paper, that particularly requires good glossiness. In particular, bleeding between colors can be prevented and whitening caused by reflected light generated as the amount of adhered inks increases can be prevented even when a recording medium, such as printing paper, including a coating layer for receiving oil-based inks on its surface is used.

Polyorganosiloxane surfactants are preferred as the surfactant used in the present invention. In forming an image to be recorded, the wettability to the recording medium surface is increased and the permeability of the ink can be increased. In the case where a polyorganosiloxane surfactant is used, the solubility of the surfactant in the ink improves due to incorporation of the above-described four types of components and generation of the insoluble matter or the like can be suppressed. Thus, an ink composition having a higher ejection stability can be realized.

Commercially available products may be used as the surfactant. For example, Olfine PD-501, Olfine PD-502, and Olfine PD-570 (all are products of Nissin Chemical Industry Co., Ltd.) and the like can be used.

More preferably, the polyorganosiloxane surfactant contains at least one compound represented by formula (I)

[Chem. 1]

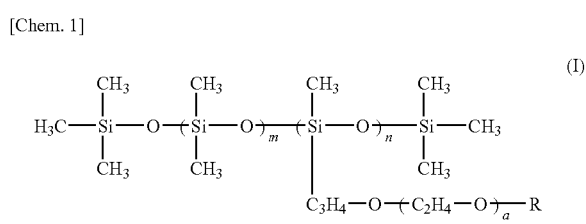

(where R represents a hydrogen atom or a methyl group; a represents an integer of 2 to 11, m represents an integer of 2 to 50, and n represents an integer of 1 to 5) or at least one compound represented by formula (I) above where R is a hydrogen atom or a methyl group, a is an integer of 2 to 13, m is an integer of 2 to 50, and n is an integer of 1 to 5. More preferably, the surfactant contains at least one compound represented by formula (I) above where R is a hydrogen atom or a methyl group, a is an integer of 2 to 13, m is an integer of 2 to 50, and n is an integer of 1 to 8. More preferably, the surfactant contains at least one compound represented by formula (I) where R is a methyl group, a is an integer of 6 to 18, m is 0, and n is 1. When such a particular polyorganosiloxane surfactant is used, uneven aggregation of inks can be overcome even when an image is printed on printing paper serving as a recording medium.

Among compounds represented by formula (I), following compounds are preferably used: compounds in which a is an integer of 2 to 5, m is an integer of 20 to 40, and n is an integer of 2 to 4; compounds in which a is an integer of 7 to 11, m is an integer of 30 to 50, and n is an integer of 3 to 5; compounds in which a is an integer of 9 to 13, m is an integer of 2 to 4, and n is an integer of 1 to 2; and compounds in which a is an integer of 6 to 10, m is an integer of 10 to 20, and n is an integer of 4 to 8. When these compounds are used, uneven aggregation of inks can be further suppressed.

More preferably, a compound represented by formula (I) where R is a hydrogen atom, a is an integer of 2 to 5, m is an integer of 20 to 40, and n is an integer of 2 to 4 or a compound represented by formula (I) where a is an integer of 7 to 11, m is an integer of 30 to 50, and n is an integer of 3 to 5 is used as the compound represented by formula (I). When such a compound is used, uneven aggregation of inks and bleeding can be further suppressed.

More preferably, a compound represented by formula (I) where R is a methyl group, a is an integer of 9 to 13, m is an integer of 2 to 4, and n is an integer of 1 to 2 or a compound represented by formula (I) where a is an integer of 6 to 10, m is an integer of 10 to 20, and n is an integer of 4 to 8 is used as the compound represented by formula (I). When such a compound is used, uneven aggregation of inks and bleeding can be further suppressed.

More preferably, a compound represented by formula (I) where R is a methyl group, a is an integer of 6 to 12, m is 0, and n is 1 is used as the compound represented by formula (I). When such a compound is used, uneven aggregation of inks and bleeding can be further suppressed.

Most preferably, a mixture of a compound represented by formula (I) where a is an integer of 7 to 11, m is an integer of 30 to 50, and n is an integer of 3 to 5, a compound represented by formula (I) where R is a methyl group, a is an integer of 9 to 13, m is an integer of 2 to 4, and n is an integer of 1 to 2, and a compound represented by formula (I) where R is a methyl group, a is an integer of 6 to 10, m is an integer of 10 to 20, and n is an integer of 4 to 8 is used. When such compounds are used, the coagulation nonuniformity of inks and bleeding can highly suppressed.

The surfactant content in the ink composition of the present invention is preferably 0.01 to 1.0 percent by weight and more preferably 0.05 to 0.50 percent by weight. More preferably, both a surfactant where R is a methyl group and a surfactant where R is a hydrogen atom are used since small-size font characters appear clear. In particular, in the case where a surfactant where R is a methyl group is used, the surfactant content is preferably larger than the case in which a surfactant with R representing H is used so as to suppress uneven aggregation of inks.

The larger the content of the surfactant with R representing H relative to the surfactant with R representing a methyl group, the more preferred. In this manner, uneven aggregation of inks and bleeding can be suppressed on printing paper, such as cast-coated paper, that repels inks easily and exhibits a low permeation rate.

The surfactant used in the present invention may include a gemini surfactant. When a gemini surfactant is used in combination with the four types of components described above, a sparingly water-soluble solvent can be homogeneously dispersed and thus the initial viscosity of the ink can be decreased. Thus, the colorant content and the content of an anti-clogging agent or the like in the ink composition can be increased, and an image having a good color property can be formed on not only regular paper but also a recording medium with a porous surface coated with a resin or particles for accepting inks on its surface. In particular, even in the cases where a recording medium, such as printing paper, that has a coating layer for receiving oil-based ink is formed as the receiving layer on the surface, bleeding between colors can be prevented and the color density unevenness caused ink flows between dots can be prevented. Although the reason therefor is not clear, it is presumed that because the gemini surfactant has a good orientation property, it forms a highly stable oil gel with the sparingly water-soluble solvent, resulting in loss of flowability of the colorant. Thus, the effect of adding the gemini surfactant becomes notable as the amount of the sparingly water-soluble solvent increases. Note that a "gemini surfactant" refers to a surfactant having a structure in which two surfactant molecules are bonded to each other through a linker.

The gemini surfactant is preferably a two-chain three-hydrophilic group-type surfactant in which hydrophilic group portions of a pair of single-chain surfactants are bonded to each other through a linker having a hydrophilic group. The hydrophilic moiety of the single chain type surfactant is preferably an acidic amino acid moiety and the linker is preferably a basic amino acid. Specific examples thereof include surfactants synthesized by bonding a pair of single chain surfactants having glutamic acid or aspartic acid in the hydrophilic moiety to each other through a linker such as arginine, lysine, or histidine. In the present invention, the gemini surfactant is preferably a surfactant represented by chemical formula (II)

[Chem. 2]

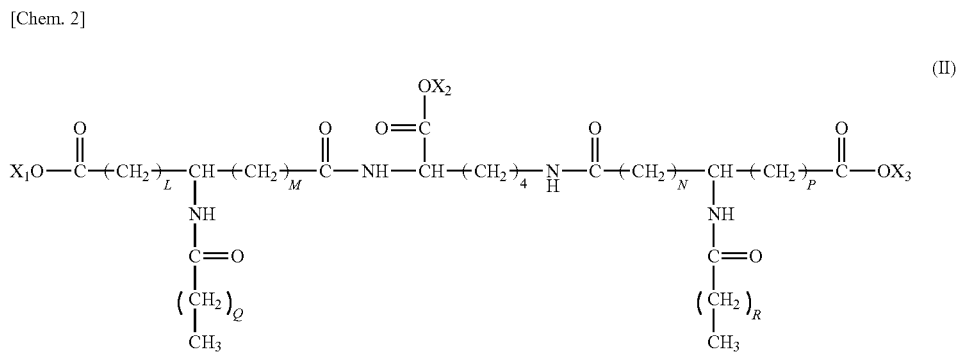

(in the formula, $X_1$, $X_2$, and $X_3$ each independently represent a hydrogen atom or an alkali metal but do not simultaneously represent a hydrogen atom or an alkali metal, L and M each independently represent 0 or 2 but do not simultaneously represent 0 or 2, N and P each independently represent 0 or 2 but do not simultaneously represent 0 or 2, and Q and R each represent an integer of 8 to 18).

In formula (II), the alkali metal is preferably Na and Q and R are each preferably about 10. Examples of such a compound include sodium salts of condensates of N-lauroyl-L-glutamic acid and L-lysine. Commercially available products may be used as the compound represented by the formula above. For example, Pellicer L-39 (produced by Asahi Kasei Chemicals Corporation) which is an aqueous solution containing 30% sodium salt of a condensate of N-lauroyl-L-glutamic acid and L-lysine is suitable for use.

In this invention, when the gemini surfactant is used, in forming an image to be recorded, the wettability to the recording medium surface is increased and the permeability of the ink can be increased. As a result, uneven aggregation of inks can be suppressed even when an image is printed on printing paper serving as a recording medium. The solubility of the surfactant in the ink improves due to incorporation of the above-described four types of components in the ink composition and generation of the insoluble matter or the like can be suppressed. Thus, an ink composition having a higher ejection stability can be realized.

The ink composition of the present invention may further contain another surfactant, namely, an acetylene glycol surfactant, an anionic surfactant, a nonionic surfactant, and an ampholytic surfactant, or the like.

Examples of the acetylene glycol surfactant include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available products may also be used as the acetylene glycol surfactant. Examples thereof include Olfine E1010, STG, and Y (trade names, products of Nissin Chemical Industry Co., Ltd.), Surfinol 61, 104, 82, 465, 485, and TG (trade names, products of Air Products and Chemicals Inc.).

<Water and Other Components>

The ink composition for ink jet recording according to the present invention contains water as a solvent in addition to the specific alcohol solvents, surfactant, sugar, and other additives described above. Water is preferably pure water or ultrapure water such as ion exchange water, ultrafiltered water, reverse osmosis water, and distilled water. Any one of these water sterilized by ultraviolet irradiation, hydrogen peroxide addition, or the like is preferred since generation of mold and bacteria can be prevented for a long time.

The ink composition of the present invention preferably further contains a penetrant in addition to the components described above.

Surfactants such as anionic surfactants, cationic surfactants, and ampholytic surfactants, alcohols such as methanol, ethanol, and iso-propyl alcohol, and glycol ethers are suitable for use as the penetrant. Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. These may be used alone or as a mixture of two or more. Of the glycol ethers above, alkyl ethers of polyhydric alcohols are preferred. In particular, ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monomethyl ether, triethylene glycol monoethyl ether, and triethylene glycol mono-n-butyl ether are preferred.

More preferable is triethylene glycol mono-n-butyl ether. It should be noted that some of the alkyl ethers of polyhydric alcohols described above naturally also serve as a penetrant when added in the ink composition.

Some of the glycol ethers used as the penetrant described above overlap with alkyl ethers of polyhydric alcohols used from the viewpoints of aggregation property, flash point, environmental toxicity, and eco toxicity; however, there are those glycol ethers that exhibit both effects.

The amount of the penetrant added may be any appropriate value but is preferably about 0.1 to 30 percent by weight and more preferably about 1 to 20 percent by weight.

The ink composition of the present invention preferably further contains a recording medium-dissolving agent in addition to the components described above.

As the recording medium-dissolving agent, pyrrolidones such as N-methyl-2-pyrrolidone is preferably used. The amount of the recording medium-dissolving agent added may be any appropriate value but is preferably about 0.1 to 30 percent by weight and more preferably about 1 to 20 percent by weight.

The ink composition for the ink jet recording according to the present invention is preferably substantially free of a humectant such as glycerin. A humectant such as glycerin has a function of preventing ink from drying and solidifying in ink jet nozzles and the like. Thus, when ink is dropped on synthetic paper having a particularly low ink-absorbing property, the ink does not dry and this poses a problem in high-speed printing. Moreover, when ink containing a humectant is used, next ink adheres on the recording medium before the previous ink remains unabsorbed on the recording medium surface. Thus, uneven aggregation may occur.

Thus, in the present invention, substantially no humectant is preferably contained when a recording medium having a particularly low ink-absorbing property is used. Note that even when ink has been solidified by drying in the ink jet nozzles, the solidified ink can be re-dissolved by using a solution containing a humectant.

In particular, in the present invention, the ink composition is preferably substantially free of a humectant such as glycerin having a vapor pressure of 2 mPa or less at 25° C. "Substantially free" means that the humectant content in the ink composition is less than 1 percent by weight.

When the content of the humectant having a vapor pressure of 2 mPa or less at 25° C. is less than 1 percent by weight relative the ink, an image can be printed by an ink jet recording method on not only a recording medium, such as printing paper, that has a low ink absorbing property but also a metal or plastic that has no ink absorbing property. Although it is obvious for persons skilled in the art that some of the penetrating solvents described above also function as humectants, in this specification, the penetrating solvents described above are not included in the humectants. Also in this specification, the alcohol solvents described above (the sparingly water-soluble alkanediol, the water-soluble 1,2-alkanediol, the dialkylene glycol, and the water-soluble alkanetriol) are not included in the humectants.

In this specification, a "humectant" refers to a humectant used in common ink compositions for ink jet recording, and specifically refers to glycerin, ethylene glycol, and water-soluble alkanediols having 3 to 5 carbon atoms such as 1,3-propanediol, 3-methyl-1,3-butanediol, 1,3-butanediol, and 1,2-pentanediol. When the recording medium is printing paper or the like that has a low ink absorbing property, these humectants can be adequately added.

The ink composition of the present invention may further contain a nozzle clogging-preventing agent, a preservative, an antioxidant, a conductivity adjustor, a pH adjustor, a viscosity adjustor, a surface tension adjustor, an oxygen absorber, and the like.

Examples of the preservative and fungicide include sodium benzoate, sodium pentachlorophenol, sodium 2-pyridinethiol-1-oxide, sodium sorbate, sodium dehydroacetate, and 1,2-dibenzinethiazolin-3-one (Proxel CRL, Proxel BND, Proxel GXL, Proxel XL-2, and Proxel TN produced by ICI).

Examples of the pH adjustor, other dissolving aids, and the anti-oxidants include amines such as diethanolamine, triethanolamine, propanolamine, and morpholine and their modified products; inorganic salts such as potassium hydroxide, sodium hydroxide, and lithium hydroxide; ammonium hydroxide and quaternary ammonium hydroxide (e.g., tetramethyl ammonium); carbonates such as potassium carbonate, sodium carbonate, and lithium carbonate; other phosphates; ureas such as N-methyl-2-pyrrolidone, urea, thiourea, and tetramethylurea; allophanates such as allophanate and methyl allophanate; biurets such as biuret, dimethyl biuret, and tetramethyl biuret; and L-ascorbic acid and salts thereof.

The ink composition of the present invention may contain an antioxidant and an ultraviolet absorber. Examples thereof include Tinuvin 328, 900, 1130, 384, 292, 123, 144, 622, 770, and 292, Irgacor 252 153, and Irganox 1010, 1076, 1035, and MD1024 produced by Ciba Specialty Chemicals, and oxides of lanthanides.

The ink composition of the present invention can be manufactured by dispersing and mixing the components described above by adequate techniques. Preferably, first, a pigment, a polymer dispersant, and water are mixed with each other in an adequate dispersing device (e.g., a ball mill, a sand mill, an attritor, a roll mill, an agitator mill, a Henschel mixer, a colloid mill, an ultrasonic homogenizer, a jet mill, or an angstrom mill) to prepare a homogeneous pigment dispersion, and then a resin (resin emulsion) separately prepared, water, a water-soluble organic solvent, a sugar, a pH adjustor, a preservative, a fungicide, and the like are added thereto to be sufficiently dissolved and to thereby prepare an ink solution. After thorough stirring, the mixture is filtered to remove coarse particles and foreign matter that cause clogging to obtain a desired ink composition.

Ink Jet Recording Method

According to an ink jet recording method of the present invention, droplets of the above-mentioned ink composition are ejected and allowed to adhere onto a recording medium to carry out printing. According to the recording method of the present invention, synthetic paper or printing paper is preferably used as the recording medium. In particular, even when low-resolution printing is conducted on art paper, high-quality paper for print-on-demand (POD) usages, or special paper for laser printers, high-quality images free of while streaks or rough textures can be achieved. Examples of the high-quality paper for POD usage include Ricoh business coat gloss 100 (product of Ricoh Corporation Ltd.). Examples of the special paper for laser printers include LPCCTA4 (product of Seiko Epson Corporation).

EXAMPLES

The present invention will now be described by using Examples; however, these examples do not limit the scope of the present invention.

<Preparation of Ink Composition>

Components are mixed with each other according to the compositions shown in Tables 1 to 6 below and each resulting mixture was filtered with a 10 μm membrane filter to prepare inks. The styrene-acrylic acid resin in the tables refers to a copolymer having a molecular weight of 1600 and an acid value of 150. The urethane resin refers to a copolymer having a molecular weight of 6000 and an acid value of 50. The fluorene resin refers to a resin having a molecular weight of 3300 and containing about 50 percent by weight of a monomer having a fluorene backbone represented by CAS No. 117344-32-8. The surfactant used was a polyorganosiloxane surfactant obtained by mixing a compound represented by formula (I) above where R is a methyl group, a is an integer of 9 to 13, m is an integer of 2 to 4, and n is an integer of 1 to 2 and a compound represented by formula (I) where R is a hydrogen atom, a is an integer of 7 to 11, m is an integer of 30 to 50, and n is an integer of 3 to 5.

TABLE 1

| | Composition | Example 1 Ink set 1 | | | | Example 2 Ink set 2 | | | | Example 3 Ink set 3 | | | | Example 4 Ink set 4 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 2.8 | 2.8 | 2.8 | 5.6 | 2.8 | 2.8 | 2.8 | 5.6 | 2.8 | 2.8 | 2.8 | 5.6 | 2.8 | 2.8 | 2.8 | 5.6 |
| | Urethane resin | — | — | — | — | — | — | — | — | — | — | — | — | — | — | — | — |
| | Fluorene resin | — | — | — | — | — | — | — | — | — | — | — | — | — | — | — | — |
| Alcohol solvent | 1,2-Octanediol | 1 | 1 | 1 | 1 | 3 | 3 | 3 | 3 | 1 | 1 | 1 | 1 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | Dipropylene glycol | 3 | 3 | 3 | 3 | 3 | 3 | 3 | 3 | 6 | 6 | 6 | 6 | 3 | 3 | 3 | 3 |
| | 1,2,6-Hexanetriol | 1.5 | 1.5 | 1.5 | 1.5 | 1.5 | 1.5 | 1.5 | 1.5 | 3 | 3 | 3 | 3 | 1.5 | 1.5 | 1.5 | 1.5 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

TABLE 2

| | Composition | Example 5 Ink set 5 | | | | Example 6 Ink set 6 | | | | Example 7 Ink set 7 | | | | Example 8 Ink set 8 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 2.8 | 2.8 | 2.8 | 5.6 | 2.8 | 2.8 | 2.8 | 5.6 | 2.8 | 2.8 | 2.8 | 5.6 | 2.8 | 2.8 | 2.8 | 5.6 |
| | Urethane resin | — | — | — | — | — | — | — | — | — | — | — | — | — | — | — | — |
| | Fluorene resin | — | — | — | — | — | — | — | — | — | — | — | — | — | — | — | — |
| Alcohol solvent | 1,2-Octanediol | 1 | 1 | 1 | 1 | 3 | 3 | 3 | 3 | 1 | 1 | 1 | 1 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | Dipropylene glycol | 3 | 3 | 3 | 3 | 3 | 3 | 3 | 3 | 6 | 6 | 6 | 6 | 3 | 3 | 3 | 3 |
| | 1,2,6-Hexanetriol | 6 | 6 | 6 | 6 | 6 | 6 | 6 | 6 | 12 | 12 | 12 | 12 | 6 | 6 | 6 | 6 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

TABLE 3

| | Composition | Example 9 Ink set 9 | | | | Example 10 Ink set 10 | | | | Example 11 Ink set 11 | | | | Example 12 Ink set 12 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| | Urethane resin | — | — | — | — | — | — | — | — | — | — | — | — | — | — | — | — |
| | Fluorene resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| Alcohol solvent | 1,2-Octanediol | 1 | 1 | 1 | 1 | 3 | 3 | 3 | 3 | 1 | 1 | 1 | 1 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | Dipropylene glycol | 3 | 3 | 3 | 3 | 3 | 3 | 3 | 3 | 6 | 6 | 6 | 6 | 3 | 3 | 3 | 3 |
| | 1,2,6-Hexanetriol | 1.5 | 1.5 | 1.5 | 1.5 | 1.5 | 1.5 | 1.5 | 1.5 | 3 | 3 | 3 | 3 | 1.5 | 1.5 | 1.5 | 1.5 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

TABLE 4

| | Composition | Example 13 Ink set 13 | | | | Example 14 Ink set 14 | | | | Example 15 Ink set 15 | | | | Example 16 Ink set 16 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| | Urethane resin | — | — | — | — | — | — | — | — | — | — | — | — | — | — | — | — |
| | Fluorene resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| Alcohol solvent | 1,2-Octanediol | 1 | 1 | 1 | 1 | 3 | 3 | 3 | 3 | 1 | 1 | 1 | 1 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | Dipropylene glycol | 3 | 3 | 3 | 3 | 3 | 3 | 3 | 3 | 6 | 6 | 6 | 6 | 3 | 3 | 3 | 3 |
| | 1,2,6-Hexanetriol | 6 | 6 | 6 | 6 | 6 | 6 | 6 | 6 | 12 | 12 | 12 | 12 | 6 | 6 | 6 | 6 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

TABLE 5

| | Composition | Example 17 Ink set 17 | | | | Example 18 Ink set 18 | | | | Example 19 Ink set 19 | | | | Example 20 Ink set 20 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| | Urethane resin | — | — | — | — | — | — | — | — | — | — | — | — | — | — | — | — |
| | Fluorene resin | 1.4 | 1.4 | 1.4 | 2.8 | 1.4 | 1.4 | 1.4 | 2.8 | 1.4 | 1.4 | 1.4 | 2.8 | 1.4 | 1.4 | 1.4 | 2.8 |
| Alcohol solvent | 1,2-Octanediol | 1 | 1 | 1 | 1 | 1 | 1 | 1 | 1 | 3 | 3 | 3 | 3 | 3 | 3 | 3 | 3 |
| | 1,2-Hexanediol | 0.5 | 0.5 | 0.5 | 0.5 | 2.5 | 2.5 | 2.5 | 2.5 | 0.5 | 0.5 | 0.5 | 0.5 | 2.5 | 2.5 | 2.5 | 2.5 |
| | Triethylene glycol monomethyl ether | 2.5 | 2.5 | 2.5 | 2.5 | 0.5 | 0.5 | 0.5 | 0.5 | 2.5 | 2.5 | 2.5 | 2.5 | 0.5 | 0.5 | 0.5 | 0.5 |
| | Dipropylene glycol | 6 | 6 | 6 | 6 | 6 | 6 | 6 | 6 | 3 | 3 | 3 | 3 | 3 | 3 | 3 | 3 |
| | 1,2,6-Hexanetriol | 3 | 3 | 3 | 3 | 12 | 12 | 12 | 12 | 1.5 | 1.5 | 1.5 | 1.5 | 6 | 6 | 6 | 6 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

TABLE 6

| | Composition | Comparative Example 1 Ink set 21 | | | | Comparative Example 2 Ink set 22 | | | | Comparative Example 3 Ink set 23 | | | | Comparative Example 4 Ink set 24 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 7.0 | — | — | — | 7.0 | — | — | — | 7.0 | — | — | — | 7.0 | — | — | — |
| | C.I. Pigment Red 202 | — | 7.0 | — | — | — | 7.0 | — | — | — | 7.0 | — | — | — | 7.0 | — | — |
| | C.I. Pigment Blue 15:3 | — | — | 7.0 | — | — | — | 7.0 | — | — | — | 7.0 | — | — | — | 7.0 | — |
| | C.I. Pigment Black 7 | — | — | — | 7.0 | — | — | — | 7.0 | — | — | — | 7.0 | — | — | — | 7.0 |
| Dispersant | Styrene-acryl resin | 2.8 | 2.8 | 2.8 | 5.6 | 2.8 | 2.8 | 2.8 | 5.6 | 2.8 | 2.8 | 2.8 | 5.6 | 2.8 | 2.8 | 2.8 | 5.6 |
| | Urethane resin | — | — | — | — | — | — | — | — | — | — | — | — | — | — | — | — |
| | Fluorene resin | — | — | — | — | — | — | — | — | — | — | — | — | — | — | — | — |
| Alcohol solvent | 1,2-Octanediol | 0 | 0 | 0 | 0 | 3 | 3 | 3 | 3 | 3 | 3 | 3 | 3 | 3 | 3 | 3 | 3 |
| | 1,2-Hexanediol | 3 | 3 | 3 | 3 | 0 | 0 | 0 | 0 | 3 | 3 | 3 | 3 | 3 | 3 | 3 | 3 |
| | Dipropylene glycol | 6 | 6 | 6 | 6 | 6 | 6 | 6 | 6 | 0 | 0 | 0 | 0 | 6 | 6 | 6 | 6 |
| | 1,2,6-Hexanetriol | 12 | 12 | 12 | 12 | 12 | 12 | 12 | 12 | 12 | 12 | 12 | 12 | 0 | 0 | 0 | 0 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Ba* | Ba* | Ba* | Ba* | Ba* | Ba* | Ba* | Ba* | Ba* | Ba* | Ba* | Ba* | Ba* | Ba* | Ba* | Ba* |
| | Total | 100 | 100 | 100 | 100 | 100 | 100 | 100 | 100 | 100 | 100 | 100 | 100 | 100 | 100 | 100 | 100 |

Ba*: Balance

Examples 21 to 40 and Comparative Examples 5 to 8

Ink sets of Examples 21 to 40 and ink sets of Comparative Examples 5 to 8 were prepared by the same process except that the surfactant in the ink sets of Examples 1 to 20 and the ink sets of Comparative Examples 1 to 4 described above was changed to the surfactant described below.

The surfactant used in Examples 21 to 40 and Comparative Examples 5 to 8 contained a compound represented by formula (I) where R is a methyl group, a is an integer of 6 to 10, m is an integer of 10 to 20, and n is an integer of 4 to 8.

Examples 41 to 60 and Comparative Examples 9 to 12

Ink sets of Examples 41 to 60 and ink sets of Comparative Examples 9 to 12 were prepared by the same process except that the surfactant in the ink sets of Examples 1 to 20 and the ink sets of Comparative Examples 1 to 4 described above was changed to the surfactant described below.

The surfactant used in Examples 41 to 60 and Comparative Examples 9 to 12 was obtained by mixing a compound represented by formula (I) where R is a hydrogen atom, a is an integer of 7 to 11, m is an integer of 30 to 50, and n is an integer of 3 to 5, a compound represented by formula (I) where R is a methyl group, a is an integer of 9 to 13, m is an integer of 2 to 4, and n is an integer of 1 to 2, and a compound represented by formula (I) where R is a methyl group, a is an integer of 6 to 10, m is an integer of 10 to 20, and n is an integer of 4 to 8.

Examples 61 to 80 and Comparative Examples 13 to 16

Ink sets of Examples 61 to 80 and ink sets of Comparative Examples 13 to 16 were prepared by the same process except that the surfactant in the ink sets of Examples 1 to 20 and the ink sets of Comparative Examples 1 to 4 described above was changed to the surfactant described below.

The surfactant used in Examples 61 to 80 and Comparative Examples 13 to 16 contained a compound represented by formula (I) where R is a methyl group, a is an integer of 6 to 18, m is 0, and n is 1.

<Evaluation>
Evaluation of Initial Viscosity of Ink

The ink viscosity was evaluated for each of the inks obtained as described above. The viscosity of each ink was measured with a vibration-type viscometer (model MV100 produced by Yamaichi Electronics Co., Ltd.) one hour after completion of preparation of the ink and evaluated according to the following criteria. The measurement temperature was 20° C.

S: The viscosity was 4 mPa·s or less.
AA: The viscosity was more than 4 mPa·s and 5 mPa·s or less.
A: The viscosity was more than 5 mPa·s and 6 mPa·s or less.
B: The viscosity was more than 6 mPa·s and 7 mPa·s or less.
C: The viscosity was more than 7 mPa·s and 8 mPa·s or less.
D: The viscosity was more than 8 mPa·s.

The results of evaluation are shown in Table 7 below.
Evaluation of Viscosity after Elapse of Time Each ink prepared as above was left to stand for 3 days under a 70° C. environment and then the viscosity of the ink was measured and evaluated according to the following criteria.

A: The difference from the initial viscosity was 0.5 mPa·s or less.
B: The difference from the initial viscosity was more than 0.5 mPa·s and 1.0 mPa·s or less.
C: The difference from the initial viscosity was more than 1.0 mPa·s and 2.0 mPa·s or less.
D: The difference form the initial viscosity was more than 2.0 mPa·s.

The results of evaluation are shown in Table 7 below.
Evaluation of Ink Uneven Aggregation and Filling Property The Y, M, C, and K inks obtained as above were formed into an ink set and mounted in an ink cartridge of an ink jet printer (PX-G920 produced by Seiko Epson Corporation) so that recording could be performed at 720 dpi in the main scanning (head driving) direction and at 360 dpi in the sub scanning (recording medium feeding) direction. The voltage of the printer was adjusted so that the dot size at the time of adhesion of a droplet was 7 ng, and a 720×720 dpi solid image was recorded on OKT+ (product of Oji Paper Co., Ltd.) having a thickness of about 128 g/m2 while one operation was 720×360 dpi. Recording was conducted under a normal temperature, normal humidity environment. The amount of ink adhered was about 3.6 mg/inch$^2$.

The obtained images were evaluated by the following criteria.

A: There was no uneven aggregation or white streaks caused by filling failures.
B: There was no uneven aggregation but white streaks caused by filling failures were observed.
C: There were uneven aggregation and white streaks caused by filling failures.
D: The ink flowed significantly and evaluation could not be made.

The results of evaluation are shown in Table 7 below.
Evaluation of Curling

Printing was conducted as in above except that OKT+ (product of Oji Paper Co., Ltd.) having a thickness of 104.7 g/m$^2$ was used as a recording medium. The obtained print-out was placed on a flat desk with the printed surface up and left to be dried naturally for 24 hours under a 25° C., 40% RH environment. Then the distances between the desk and the four corners of the curled print-out were measured and averaged.

AA: The height was less than 5 mm.
A: The height was 5 mm or more and less than 10 mm.
B: The height was 10 mm or more and less than 20 mm.
C: The height was 20 mm or more.

The results of evaluation are shown in Table 7 below.
Evaluation of Initial Fixability The OKT+ print-out was rubbed with fingers after 3 minutes.

A: The colorant does not come off.
B: The colorant comes off.

The results of evaluation are shown in Table 7 below.
Evaluation of solubility of sparingly water-soluble alkanediol An aqueous solution having a 1,2-octanediol content of 10 percent by weight was prepared by using 1,2-octanediol as the sparingly water-soluble alkanediol. The aqueous solution was clouded since 1,2-octanediol was not completely dissolved.

To 10 g of the aqueous solution prepared as above, alcohol solvents, namely, 1,2-hexanediol (HED), dipropylene glycol (DPG), 1,2,6-hexanetriol (HET), 3-methyl-1,3,5-pentanetriol (3 MPET), a mixed solution of DPG and HET (DPG:HET=3:1) (hereinafter referred to as "solution A"), and a mixed solution of DPG and HET (DPG:HET=1:3) (hereinafter referred to as "solution B") were added and the addition was continued until the aqueous solution became clear.

An aqueous solution containing 10 percent by weight of 1,2-octanediol serving as the sparingly water-soluble alkanediol and 10 percent by weight of 1,2-hexanediol serving as the water-soluble 1,2-alkanediol were prepared instead of the aqueous solution described above, and the individual alcohol solvents were added as above until the aqueous solution became clear.

The amount (g) of each alcohol solvent added until the aqueous solution became clear, i.e., the amount at which the sparingly water-soluble alkanediol was completely dissolved, was as shown in FIG. 1.

As apparent from FIG. 1, the solubility of the 1,2-octanediol, i.e., the sparingly water-soluble alkanediol, increases with the number of the alcohol solvents other than the sparingly water-soluble alkanediol, i.e., a two-component system is better than the one-component system and a three-component system is better than the two-component system. Although 1,2-hexanediol (HED) can dissolve the sparingly water-soluble alkanediol at a relatively small amount, curling tends to be significant with the increase in HED content. In order to achieve a sufficient solubility for the sparingly water-soluble alkanediol in a two-component system including HED and 1,2,6-hexanetriol (HET) while suppressing the HED content, a large amount of HET is necessary and this tends to increase the initial viscosity. In the two-component system including HED and dipropylene glycol (DPG), the ink weight tends to vary between low-resolution printing and high-resolution printing. This is presumably because in high-resolution printing, the ink weight tends to vary unless the ink meniscus is stable. In other words, it can be presumed that when the ratio of the HET content to the DPG content is adjusted to 3:1 to 1:3 in the three-component system including HED, HET, and DPG, the variation of the ink weight between high-resolution printing and low-resolution printing can be suppressed and stable printouts can be obtained.

Evaluation of Ink Weight Variation

Figure 2:
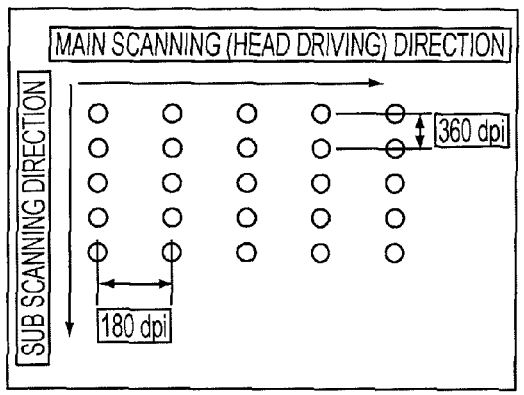
FIG. 2 is a diagram showing two print patterns used in evaluating variations in ink weight.
Figure 2:
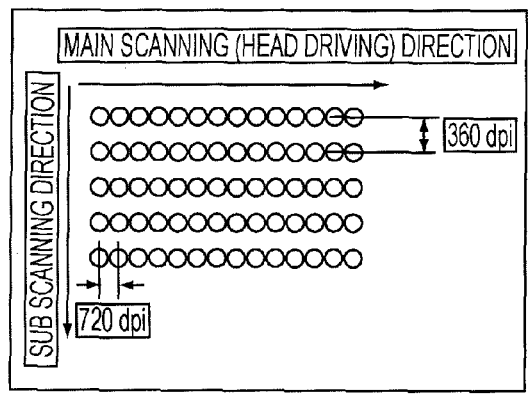

A brand ink cartridge was mounted on an ink jet printer (PX-G920 produced by Seiko Epson Corporation) so that the recording could be conducted at 720 dpi in the main scanning (head driving) direction and at 360 dpi in the sub scanning (recording medium feeding) direction, and the voltage was adjusted so that the ink weight at the time of adhesion of a droplet was about 7 ng. The Y, M, C, and K inks obtained as above as an ink set were charged in an ink cartridge and the ink cartridge was mounted on an ink jet printer. Then two printing patterns shown in FIG. 2 were printed and the difference in the weight of the ink cartridge between before and after printing was measured to determine the ink weight.

The difference in ink weight derived from the difference in the two print patterns was assumed to be the variation of the ink weight, and the evaluation was conducted according to the following criteria.

A: The variation in ink weight due to the difference in patterns is less than +30.

B: The variation in ink weight due to the difference in patterns is +3% or more.

The results of evaluation are shown in Table 7 below.

Evaluation of Clogging Recovery Property

After the ink cartridge and the ink printer were used and an ink replacement button was pressed, the plug was pulled out. While having the head cap uncapped as such, the printer was left to stand under a 40° C., 15% RH environment for 1 day. After the printer was left to stand, cleaning operation was repeated until all nozzles performed discharging in the same manner as the early stage, and the ease of recovery was evaluated by the following criteria.

A: Clogging was resolved after repeating the cleaning operation three times.

B: Clogging was resolved after repeating the cleaning operation six times.

C: Clogging was resolved after repeating the cleaning operation twelve times.

D: Clogging was not resolved even by repeating the cleaning operation twelve times.

The results of evaluation are shown in Table 7 below.

The same evaluation was conducted on Example 21 to 40 and Comparative Examples 5 to 8 but their evaluation results were the same as those of Examples 1 to 20 and Comparative Examples 1 to 4.

The same evaluation was conducted on Example 41 to 60 and Comparative Examples 9 to 12 but their evaluation results were the same as those of Examples 1 to 20 and Comparative Examples 1 to 4.

The same evaluation was conducted on Example 61 to 80 and Comparative Examples 13 to 16 but their evaluation results were the same as those of Examples 1 to 20 and Comparative Examples 1 to 4.

Examples 81 to 160 and Comparative Examples 17 to 32 were prepared as above except that 1,2,6-hexanetriol used in Examples 1 to 80 and Comparative Examples 1 to 16 was changed to 3-methyl-1,3,5-pentanetriol. The same evaluation as above was conducted and the results were the same as those of Examples 1 to 80 and Comparative Examples 1 to 16 except for the evaluation results for curling. The evaluation results for curling improved by one grade. This shows that 3-methyl-1,3,5-pentanetriol has a higher curl-suppressing effect.

Clogging Recovery Property of Air Open Cap

Ink (260 mg/inch$^2$) was discharged using PX-G920 into a cap under a 40° C. and 15% RH environment, the head was moved to an ink-replacement position, and the cap was left open to air and left to stand for 2 hours. This operation was conducted ten times or twenty times. Then cleaning was conducted once with a printer driver, an operation of printing a nozzle check pattern on one sheet was conducted three times, and the three sheets on which the nozzle check pattern was printed were observed.

A: Ink deposits were not found in the cap after twenty times of operation and the nozzle check pattern was printed normal.

B: Ink deposits were not found in the cap after ten times of operation and the nozzle check pattern was printed normal. However, after twenty times of operation, ink deposits were found in the cap and the nozzle check pattern was not printed normal.

TABLE 7

| | Evaluation of ink initial viscosity | Evaluation of viscosity after elapse of time | Evaluation of ink uneven aggregation and filling property | Evaluation of curling | Evaluation of initial fixability | Evaluation of ink weight variation | Evaluation of clogging property |
|---|---|---|---|---|---|---|---|
| Example 1 | A | C | C | C | A | A | C |
| Example 2 | C | D | B | C | A | A | C |
| Example 3 | C | D | C | C | A | A | B |
| Example 4 | C | D | B | C | A | A | C |
| Example 5 | B | C | C | B | A | A | B |
| Example 6 | C | D | B | B | A | A | B |
| Example 7 | C | D | C | A | B | A | A |
| Example 8 | C | D | A | C | A | A | B |
| Example 9 | S | A | B | C | A | A | B |
| Example 10 | AA | A | A | C | A | A | B |
| Example 11 | AA | A | B | C | A | A | B |
| Example 12 | AA | A | A | C | A | A | B |
| Example 13 | S | A | B | B | A | A | B |
| Example 14 | AA | A | A | B | A | A | B |
| Example 15 | AA | A | C | A | B | A | A |
| Example 16 | AA | A | A | C | A | A | B |
| Example 17 | AA | A | B | C | A | A | B |
| Example 18 | AA | A | C | A | B | A | A |
| Example 19 | AA | A | A | C | A | A | B |
| Example 20 | AA | A | A | C | A | A | B |
| Co. Ex.* 1 | C | B | D | A | B | B | B |
| Co. Ex. 2 | C | D | B | A | B | B | B |
| Co. Ex. 3 | C | D | A | C | A | B | B |
| Co. Ex. 4 | C | D | A | C | A | B | B |

*Co. Ex.: Comparative Example

C: Ink deposits were round in the cap after ten times of the operation, and the nozzle check pattern was not printed normal.

The results of evaluation are shown in Table 8 below.

TABLE 8

| | Evaluation of clogging recovery property of air open cap |
|---|---|
| Example 1 | C |
| Example 2 | C |
| Example 3 | C |
| Example 4 | C |
| Example 5 | C |
| Example 6 | C |
| Example 7 | C |
| Example 8 | C |
| Example 9 | C |
| Example 10 | C |
| Example 11 | C |
| Example 12 | C |
| Example 13 | C |
| Example 14 | C |
| Example 15 | C |
| Example 16 | C |
| Example 17 | A |
| Example 18 | B |
| Example 19 | A |
| Example 20 | B |
| Comparative Example 1 | B |
| Comparative Example 2 | C |
| Comparative Example 3 | C |
| Comparative Example 4 | C |

What is claimed is:

1. An ink composition for ink jet recording, comprising at least a colorant, water, and a surfactant,
wherein the ink composition further comprises at least a sparingly water-soluble alkanediol, a water-soluble 1,2-alkanediol, a dialkylene glycol, and a water-soluble alkanetriol, wherein the content ratio of the water-soluble 1,2-alkanediol to the total of the dialkylene glycol and the water-soluble alkanetriol is 1:1 to 1:18.

2. The ink composition according to claim 1, wherein the sparingly water-soluble alkanediol is an alkanediol having 7 or more carbon atoms.

3. The ink composition according to claim 1, wherein the water-soluble 1,2-alkanediol is an alkanediol having 6 or fewer carbon atoms.

4. The ink composition according to claim 1, wherein the content ratio of the sparingly water-soluble alkanediol to the water-soluble 1,2-alkanediol is 6:1 to 1:3.

5. The ink composition according to claim 1, wherein the content ratio of the water-soluble 1,2-alkanediol to the dialkylene glycol is 1:1 to 1:12.

6. The ink composition according to claim 1, wherein the content ratio of the dialkylene glycol to the water-soluble alkanetriol is 3:1 to 1:3.

7. The ink composition according to claim 1, wherein the sum of the content of the sparingly water-soluble alkanediol and the content of the water-soluble 1,2-alkanediol is 6 percent by weight or less relative to the ink composition.

8. The ink composition according to claim 1, wherein 1 to 3 percent by weight of the sparingly water-soluble alkanediol is contained relative to the ink composition.

9. The ink composition according to claim 1, wherein 0.5 to 3 percent by weight of the water-soluble 1,2-alkanediol is contained relative to the ink composition.

10. The ink composition according to claim 1, wherein the sparingly water-soluble alkanediol is 1,2-octanediol.

11. The ink composition according to claim 1, wherein the water-soluble 1,2-alkanediol is at least one selected from the group consisting of 1,2-hexanediol, 4-methyl-1,2-pentanediol, and 3,3-dimethyl-1,2-butanediol.

12. The ink composition according to claim 1, wherein the dialkylene glycol is dipropylene glycol.

13. The ink composition according to claim 1, wherein 0.01 to 1.0 percent by weight of the surfactant is contained relative to the ink composition.

14. The ink composition according to claim 13, wherein the surfactant is a polyorganosiloxane surfactant.

15. An ink jet recording method comprising ejecting droplets of an ink composition according to claim 1 and allowing the droplets to adhere on a recording medium to conduct printing.

16. The method according to claim 15, wherein the recording medium is synthetic paper mainly composed of a synthetic resin or printing paper.

17. An ink composition for ink jet recording, comprising at least a colorant, water, and a surfactant, wherein the ink composition further comprises at least a sparingly water-soluble alkanediol, a water-soluble 1,2-alkanediol, a dialkylene glycol, and a sugar wherein the content ratio of the water-soluble 1,2-alkanediol to the total of the dialkylene glycol and the sugar is 1:1 to 1:18.

18. The ink composition according to claim 17, wherein the content ratio of the sparingly water-soluble alkanediol to the water-soluble 1,2-alkanediol is 6:1 to 1:3.

19. The ink composition according to claim 17, wherein the content ratio of the water-soluble 1,2-alkanediol to the dialkylene glycol is 1:1 to 1:12.

20. The ink composition according to claim 17, wherein the content ratio of the dialkylene glycol to the sugar is 3:1 to 1:3.

* * * * *